United States Patent [19]

Wickboldt, Jr.

[11] Patent Number: 4,773,317
[45] Date of Patent: Sep. 27, 1988

[54] SYSTEM FOR COOKING DRIED FOOD STUFF

[76] Inventor: Frank Wickboldt, Jr., 1206 Nadine Ct., Orlando, Fla. 32807

[21] Appl. No.: 8,254

[22] Filed: Jan. 29, 1987

[51] Int. Cl.$^4$ .............................................. A47J 37/00
[52] U.S. Cl. ................................. 99/348; 219/10.55 E; 219/10.55 F; 366/231
[58] Field of Search .......................... 99/348, 339, 340; 366/144, 146, 147, 221, 225, 228, 230, 231; 219/10.55 E, 10.55 F, 10.55 R

[56] References Cited

U.S. PATENT DOCUMENTS

| | | | |
|---|---|---|---|
| 1,185,856 | 6/1916 | Talbert | 99/348 |
| 2,092,282 | 9/1937 | Love | 99/348 |
| 3,005,399 | 10/1961 | Libson | 99/348 |
| 3,682,091 | 8/1972 | Bredeson | 99/348 |
| 3,884,213 | 5/1975 | Smith | 99/339 |
| 3,920,228 | 11/1975 | Klauk | 99/348 |
| 4,196,342 | 4/1980 | Chailloux | 99/348 |
| 4,381,439 | 4/1983 | Miyazawa | 219/10.55 E |
| 4,395,133 | 7/1983 | Clevenholm | 99/348 |
| 4,483,620 | 11/1984 | Shinohara et al. | 366/25 |
| 4,576,089 | 3/1986 | Chauvin | 99/348 |

Primary Examiner—Robert W. Jenkins
Attorney, Agent, or Firm—Pravel, Gambrell, Hewitt, Kimball & Krieger

[57] ABSTRACT

A system for use in conjunction with a microwave oven, or an oven of the type which applies direct internal heat to the food stuffs being cooked and would include a vessel for containing the food stuffs, which would be positionable within the oven chamber and would be rotated therewithin; a plurality of blade members positionable within the cooking vessel, and maintained stationary within the vessel so that as the cooking vessel is rotated, the blades are maintained stationary to agitate the food stuffs contained within the vessel; the means located amongst the blades for assuring that the quantity of food contained within the cooking vessel is constantly agitated due to the two-tiered level of the blade members contained within the cooking vessel; and may include means for maintaining the blade members positioned substantially 90 degrees apart so that the blade members are not warped and misaligned during the cooking process. There is further included a member for ensuring that none of the food stuffs contained within the cooking vessel is maintained stationary on the top surface of the blade members by wiping the surface of the blade members as the chamber is rotated.

8 Claims, 3 Drawing Sheets

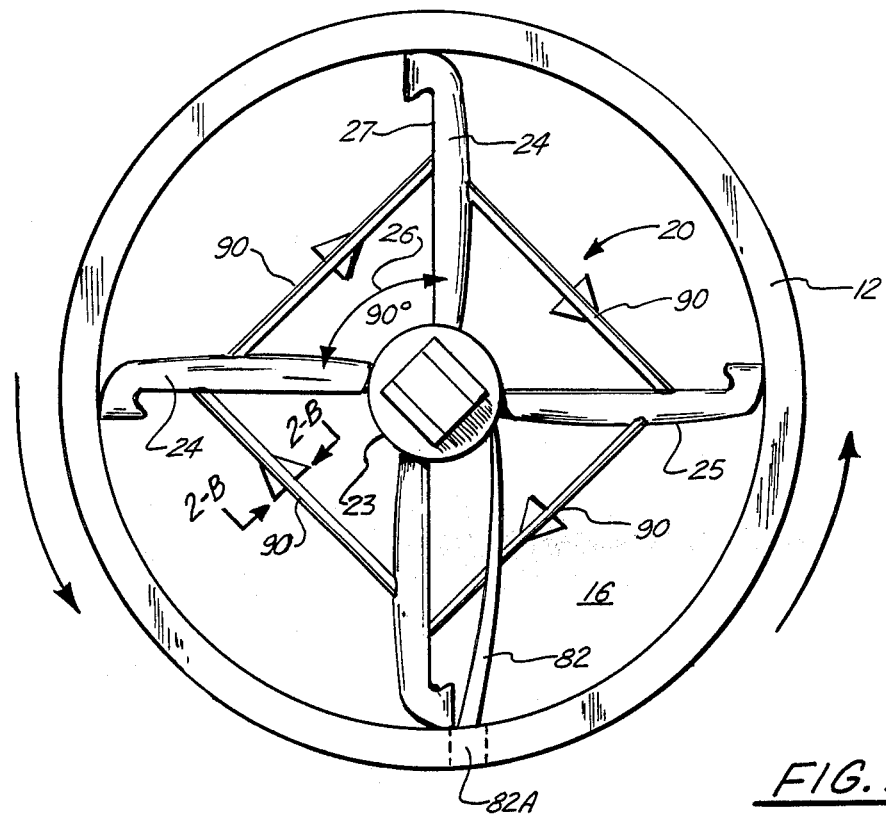
FIG. 2-A.
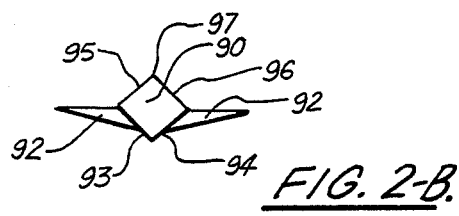
FIG. 2-B.
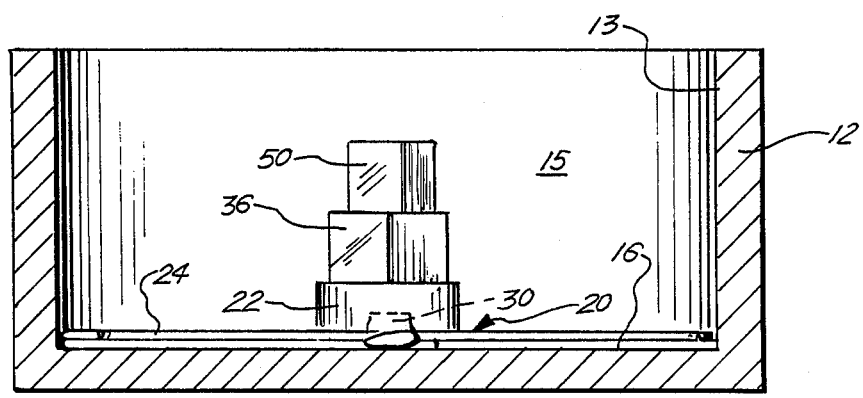
FIG. 3.

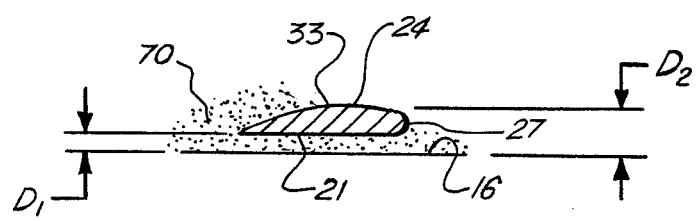
FIG. 4-A.
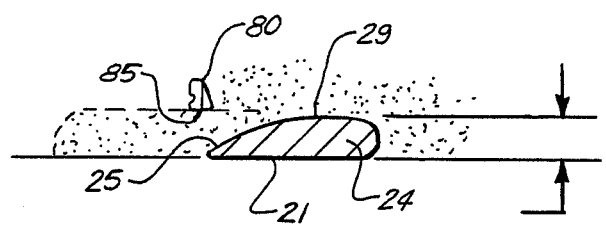
FIG. 4-B.
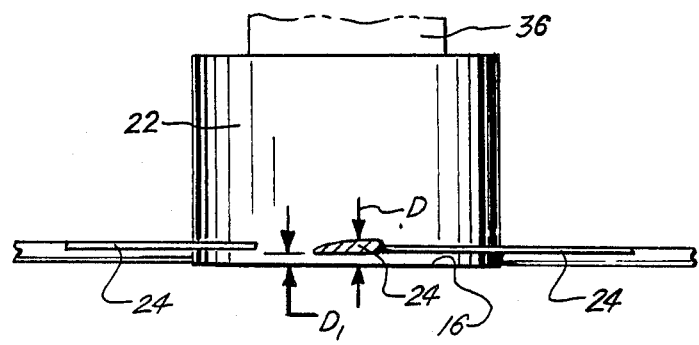
FIG. 4-C.

1

SYSTEM FOR COOKING DRIED FOOD STUFF

BACKGROUND OF THE INVENTION

1. Field of the Invention

The system of the present invention relates to the cooking of food. More particularly, the system of the present invention relates to an apparatus and method for cooking dried food stuffs in a microwave and more particularly for cooking dried raw flour into a "roux" while not allowing the flour to scorch or burn during the process.

2. General Background

It is well known in the cooking art that one of the traditional dishes served in the "Cajun" retinue of food is the famous andouille, shrimp gumbo or stew. These types of dishes require that the base of the food prepared be from a "roux" which is, in most cases, a dark, brown, tasty base made by "burning" flour in a pan in a slight amount of grease. Heat is applied to the flour within the pan, and after constant stirring, the white flour turns a dark golden brown and the roux is thus prepared. From that base, the gumbo is made by simply adding water and seasoning to the roux for obtaining the liquid portion of the gumbo.

As is readily seen in the preparation of such a roux product, the roux prepared is very greasy and has a significant amount of fat within the roux base which adds to the fat content of the gumbo or stew. It would be beneficial to prepare a roux base which may contain less or no fat, and could be prepared well in advance of the gumbo and perhaps stored for further use.

In terms of a system or method for accomplishing this end, there have been several patents granted which address the use of apparatuses for cooking food stuffs, the most pertinent being as follows:

| Patent No | Inventor | Patent Title |
|---|---|---|
| 4,395,133 | Clevenholm | "Cooking Apparatus Having a Stirring Device" |
| 3,920,228 | Klauk | "Scraping and Stirring Device For a Cooking Utensil" |
| 1,185,856 | Talbert | "Peanut Roasting Machine" |
| 3,682,091 | Bredeson | "Rendering Cooker" |
| 3,884,213 | Smith | "Cooking Apparatus" |
| 3,005,399 | Libson | "Food Mixing Apparatus" |

SUMMARY OF THE PRESENT INVENTION

The system and method of the present invention solves the problem in a simple and straightforward manner. What is provided is a system for use in conjunction with a microwave oven, or an oven of the type which applies direct internal heat to the food stuffs being cooked and would include a vessel for containing the food stuffs, which would be positionable within the oven chamber and would be rotated therewithin; a plurality of blade members positionable within the cooking vessel, and maintained stationary within the vessel so that the cooking vessel is rotated, the blades are maintained stationary to agitate the food stuffs contained within the vessel; means located amongst the blades for assuring that the quantity of food contained within the cooking vessel is constantly agitated due to the two-tiered level of the blade members contained within the cooking vessel; and may include brace members for maintaining the blade members positioned substantially 90 degrees apart so that the blade members are not warped and misaligned during the cooking process. There is further included a member for ensuring that none of the food stuffs contained within the cooking vessel is maintained stationary on the top surface of the blade members by wiping the surfaces of the blade members as the chamber is rotated.

Therefore, it is the primary object of the present invention to provide a method of cooking in a microwave oven by maintaining the food stuffs being cooked constantly agitated;

It is still a further primary object of the present invention to provide a system for cooking dried food stuffs, particularly flour, in a vessel in a microwave oven, applying microwave heat to the food stuffs, flour, yet maintaining the flour agitated so that no portion of the flour is burned during the cooking process;

It is still a further object of the present invention is to provide a method for cooking dry roux from dry or raw flour, by maintaining the flour constantly agitating within the microwave oven during the cooking process.

It is still a further object of the present invention, to provide a system for cooking a dry roux from white, powdered flour so that all of the flour contained within in the vessel is agitated during the cooking process, and no flour is maintained stationary during the cooking process.

BRIEF DESCRIPTION OF THE DRAWINGS

FIG. 2A is a top view of the preferred embodiment of the apparatus of the present invention;

FIG. 2B is a cross-sectional view of the brace members along lines 2B in FIG. 2A.

FIG. 3 is a cross-sectional view of the preferred embodiment of the apparatus of the present invention; and FIGS. 4A-4C are detailed views of the wiper blade configuration of the apparatus of the present invention.

As illustrated in FIGS. 1-4, the preferred embodiment of the apparatus of the present invention is illustrated by the numeral 10. In its preferred embodiment, apparatus 10, as was stated earlier, would be primarily designed to operate within the confines of a cooking chamber, preferably a microwave oven, wherein the type of heat generated to cook food stuffs within the oven chamber, are cooked in such a manner that the food itself is brought to the proper cooking temperature, but there is no external air within the oven chamber heated to an equivalent temperature. This is crucial in view of the fact that cooking dried food stuff, such as is suitable for the present invention, may cause ignition of any of the food stuff contained within the superheated air as may occur in a conventional oven.

Figure 1:
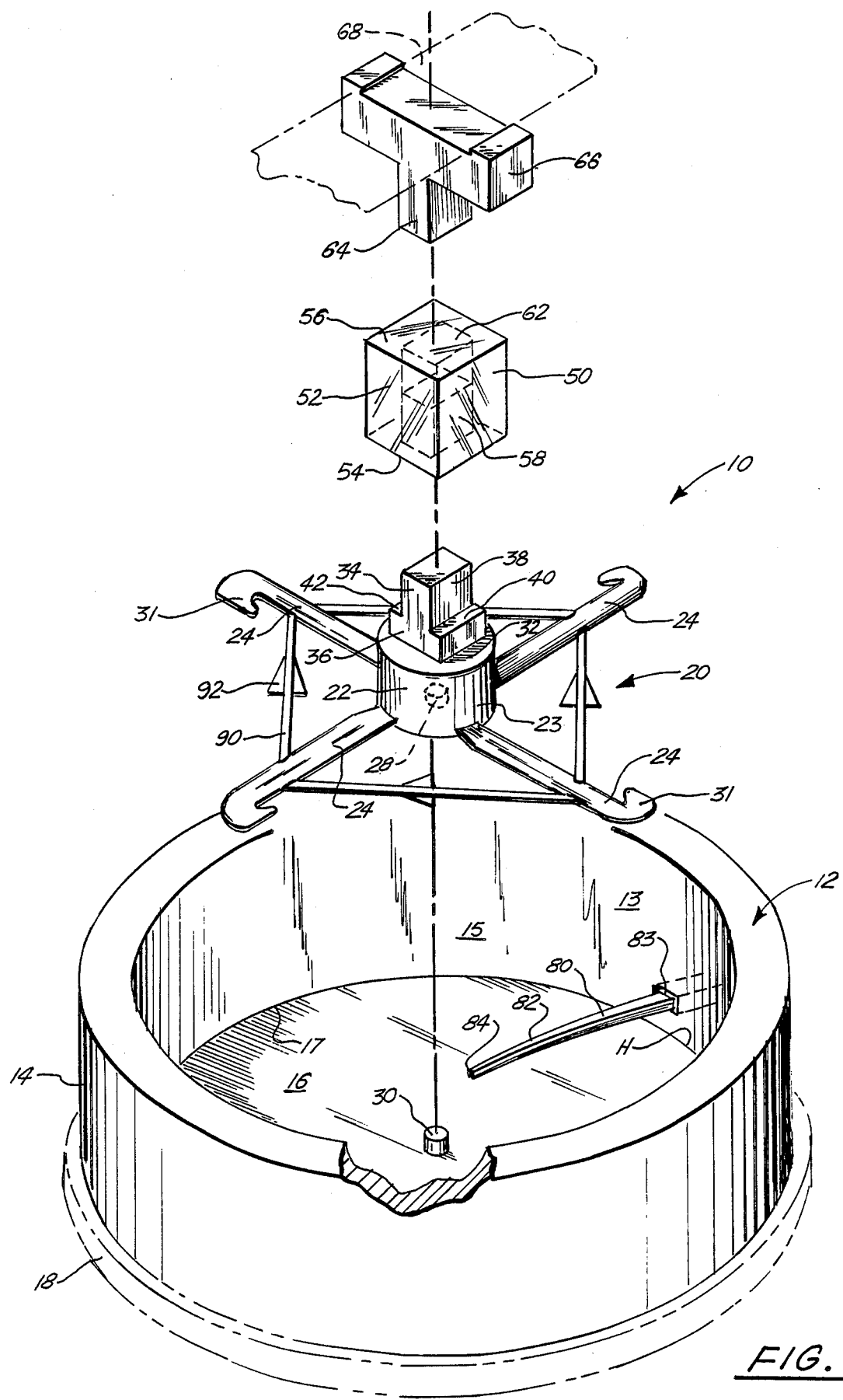
FIG. 1 is an exploded view of the preferred embodiment of the apparatus of the present invention.

Therefore, as seen in the FIGURES, apparatus 10 would generally comprise a container portion 12 having a continuous annular side wall 14 and a floor portion 16, and open ended on its upper end to receive food stuff within the cooking chamber 15 as defined by side wall 14 and floor portion 16. In its preferably use, chamber 12 would be positioned upon a rotating plate 18, of the type that may be found in certain microwave ovens, and would rotate at a speed necessary to maintain a regular rotation of the cooking chamber 12 within the oven.

As was stated earlier, dried food stuff would be prepared and cooked within chamber 15, of the type such as powered roux, which is actually dried flour placed within a certain depth, i.e., ¼ to 1 inch in depth within the bottom 16 of cooking chamber 15. Since it is imperative that the food stuff 17 contained within the chamber 15, of apparatus 12, be properly cooked, it is necessary that the food stuff, or in this case, the dried flour be constantly stirred and turned so that the heat waves, such as the microwaves striking the food stuff would maintain an even cooking balance during the cooking process. This means of maintaining the food stuff in an agitated state is achieved with the use of a wiper means 20 as will be discussed further.

Wiper means 20, as seen in FIGS. 1 and 2A, would comprise a centrally located body portion 22 having an annular side wall 23 with a plurality of blade members 24 extending from each quadrant of the annular wall portion 23, the entire wiper means 20 being also constructed of polytetrafluroethylene (known as teflon), which is unreactive to use in a microwave oven. As seen in the FIGURES, blades 24 are connected to the lower most portion of wall 23, and extend outward equally distant apart, i.e., approximately 90°. Returning to the construction of the wiper means, the body portion 22 would have adapted thereinto a lower receiving port 28 which would be of an equal diameter to centrally located peg member 30 which is attached to the floor portion 16 of chamber 12, so that peg member 30 serves as a rotating axis for wiper means 20 as it is rotated. The upper face 32 of body portion 22 is affixed with an upper mounting body 34, having a rectangular base portion 36 and an upper protruding rectangular portion 38, the positioning of portion 38 onto lower portion 36 establishing a pair of shoulder portions 40 and 42 in the construction.

As seen further situated directly above block member 34 is an upper housing portion 50 which comprises a substantially cubic shaped teflon member having side walls 52, a bottom portion 54 and a top face 56, with the bottom face 54 providing a rectangular opening 58 leading into the body portion 50, the configuration of rectangular port 58 being of similar dimensions as upper body 38 on rotating means 20, so that rectangular 38 fits securely within the rectangular port 58 in configuring the assembly.

Further, the upper face 56 of cube 50 is provided with a similarly dimensioned rectangular opening 62 for likewise receiving a downward depending rectangular member 64 which is integrally attached to a upper base member 66, which is rigidly attached to the upper frame 68 of the upper wall of the internal chamber within the microwave oven. Therefore, in the assembly, rotating member 20 would be set upon peg 30 as seen in side view in FIG. 3 and cube member 50 would serve as an intermediate connection between upper housing 66 and blade member 20; so, therefore as cooking chamber 12 is circulated within the oven, the blade means 20 is maintained stationary, so that the food stuff within chamber 12 is constantly agitated during the rotation of chamber 12 as seen in FIG. 2A.

Returning to the configuration of rotating blade means 20 as seen particularly in FIGS. 1, 2A-B and 3, each of the blade members 24 further comprise a leading downward depending edge 25 for making initial contact with the food stuff or flour on the floor portion 16 of chamber 12 as seen in FIGS. 4A-4C. There is further provided a rear rounded edge 27 for allowing any flour which is contacted by leading edge 25 to move above the upper face 29 of blade member 24 during the rotation of the chamber 12.

Further, each blade member 24 further comprises an end loop portion 31 which is designed to catch any flour or the like that may have accumulated upon the outer edge 17 between the floor portion 16 and the annular wall 15 during the cooking process. Again, it is imperative that the flour or food stuff contained within the chamber 12 be agitated at all times.

As part of the unique structure of the apparatus, it should be noted in FIGS. 4A and 4B, that each pair of blades 24 which are 180° apart, would be situated at the level so that their bottom edge 21 makes contact with the floor portion 16 as the chamber 12 is rotated. In this manner, the two opposing blades having the bottom surface 21 making contact with floor portion 16 assures that any flour or the like food material making contact with the flour 16 of container 12 is scraped away and agitated while the chamber is rotated. In addition, the opposite pairs of blades 24, as seen in FIG. 4A, are positioned on body member 23 at a level slightly above the level of the former opposing blade members 24. In this manner, as seen in 4A, bottom edge 21 is maintained a distance D1 away from floor 16 of chamber 12, so that these pair of opposing blades do not make contact with floor portion 16, yet are able to maintain agitation of the level of flour or the like food stuff within the space D2, as seen in FIG. 4A, that is that area of the level of food stuff above the level as was agitated by the blades in FIG. 4B. Likewise, this configuration can be seen more clearly in FIG. 4C, where the bottom of blade member 24 is maintained a distance above the floor 16 of chamber 12, and therefore is able to keep the flour or the like food stuff agitated during the cooking process.

Since it is crucial that any of the flour or the like food stuff 70, which is represented in FIGS. 4A and 4B by the dotted Figures, 4B is maintained agitated, it is crucial that the flour which may normally be maintained on the floor of the chamber 12 and therefore in constant circulation and agitation, that a portion of the flour or food stuff does not accumulate on the top surface 33 of each of the four blade members. If such were to occur, then that flour would in effect be maintained stationary and therefore would tend to burn and cause a distasteful taste in the food stuff. In order to eliminate this possibility, there is provided a wiper member 80, as seen particularly in FIG. 1, which comprises an elongated stem body 82, having a body portion 82A insertible in the wall 13 of chamber 12 at point 83, which stem body 82 extending outwardly over the floor 16 of chamber 12 to a point 84 which is adjacent the wall 23 of body portion 22. Wiper member 80 therefore would be removable from the wall 13 of chamber 12 so that the blade 24 could be easily removed from the chamber 12 during cleaning. The height as represented by H in FIG. 1 from the floor, is at a level so that as the chamber 12 is rotated, the member 80 is rotated there along, and is at a level as seen in FIG. 4B so that the bottom edge 85 of member 80 would make slight contact with the top edge of 29 of blade 24, and continue to contact top surface 33 wiping any flour or the like food stuffs that may have accumulated thereupon during the process. Therefore, this member assures that although flour may accumulate from time to time on the top surface 33 of blade 24, that that food stuffs is pushed off of the surface 33 during the process and is maintained in the agitated state.

For purposes of construction, there may be some instances where the chamber 12 is of rather substantial diameter in the case of rather large commercialized use. Therefore, as blade members 24 are attached to the wall 23 of body portion 22 and extend outward therefrom, and would be constructed of the "teflon" material, there is a possibility that due to an increase in length in order to cover the broad diameter of the chamber 12, that blade members 24 may become somewhat flexible and not perform in the manner which would allow them to be maintained 90 degrees apart during the rotation of the chamber. Therefore, as seen in FIGS. 1 and 2A, there would be provided means for stabilizing the blade members and maintaining them at 90 degrees positions from one another. This means would comprise transverse brace members 90 which would be situated intermediate a pair of blades and could be constructed integral thereto, so that the brace members 90 would serve to maintain each of the four blades in the position as seen in FIG. 2A.

For purposes of structural brace member 90, reference is made to FIGS. 2A and 2B. During the agitation process by blades 24, in order to enhance this agitation, each brace member 90 would be further provided with plow members 92 extending outwardly from the lower side walls 93 and 94 respectively of brace member 90, the plow members further providing agitation of any food stuffs which would be contained in that portion of the blade members where the plows are located. Each plow member being of substantially equal width as the width of blade members 24. Further, in order to reduce any possibility of food stuffs such as flour setting on the top portion of the brace members 90, FIG. 2B illustrates a cross sectional view of the shape of each blade member, i.e., a "diamond" shape, having upper side walls 95 and 96 in an apex portion 97 so that any flour which may tend to settle on brace member 90 would tend to slide off of walls 95 and 96 and fall onto the bottom 16 of container 12.

Again, for purposes of construction, since the apparatus would be used primarily at this point in a microwave oven, the material from which the apparatus would be constructed would normally be polytetraflourethylene or "teflon" to eliminate any possible disruption of the microwave process, and could be of any size to be used on a small family scale or a large commercial scale, the entire apparatus being primarily molded for the needs at the time. However, for certain types of cooking, the system may include other components other than "teflon" components such as stainless steel or the like, so that the system would be constructed in such a manner that the internal heat being applied to the food stuffs would not arc between the system components during the cooking process.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A system for preparing dry, cooked food stuffs in an oven of the type for applying internal direct heat to the food stuffs, the system comprising:
   a. A cooking chamber positionable in the oven;
   b. means positionable within the confines of the chamber, for agitating the food stuffs contained in the chamber;
   c. means for rotating the chamber during the cooking process; and
   d. a heat source for applying the direct internal heat to the food stuffs as the food stuffs are agitated within the chamber to cook the food stuffs.

2. The apparatus in claim 1, wherein the system components comprise impart molded polytetraflourethylene.

3. The apparatus in claim 1, wherein the chamber is substantially a circular chamber rotatable within the oven.

4. The apparatus in claim 1, wherein the agitation means further comprises a plurality of blade members extending from a central hub portion, each of the blade members extending outwardly to a point adjacent the wall of the chamber, so that as the chamber is rotated the blade members agitate the food stuffs contained therein.

5. The apparatus in system claim 1, wherein the system is particularly suitable for cooking dried flour for making roux.

6. The system in claim 1, wherein the blade members are so positioned within the chamber so as to provide a two-tiered level of agitation during the agitation process.

7. The system in claim 1, wherein there is further included means for removing any food stuffs which may be deposited on the top surface of the blade members during the agitation process.

8. An apparatus operable in a oven, for cooking dry powdered flour, the apparatus comprising:
   a. a substantially circular cooking chamber having an integral side wall and a floor portion for defining the cooking chamber there within;
   b. a plurality of blade members, positionable within the chamber, the blade members extending substantially across the entire diameter of the chamber;
   c. means for circulating the chamber during the cooking process;
   d. means for maintaining the blades stationary as the chamber is circulated during the cooking process;
   e. heating means for providing direct heat to the flour during the cooking process so that the flour is cooked as the chamber is rotated and the food stuffs agitated through the stationary blade members.

* * * * *